Figures 1, 2:
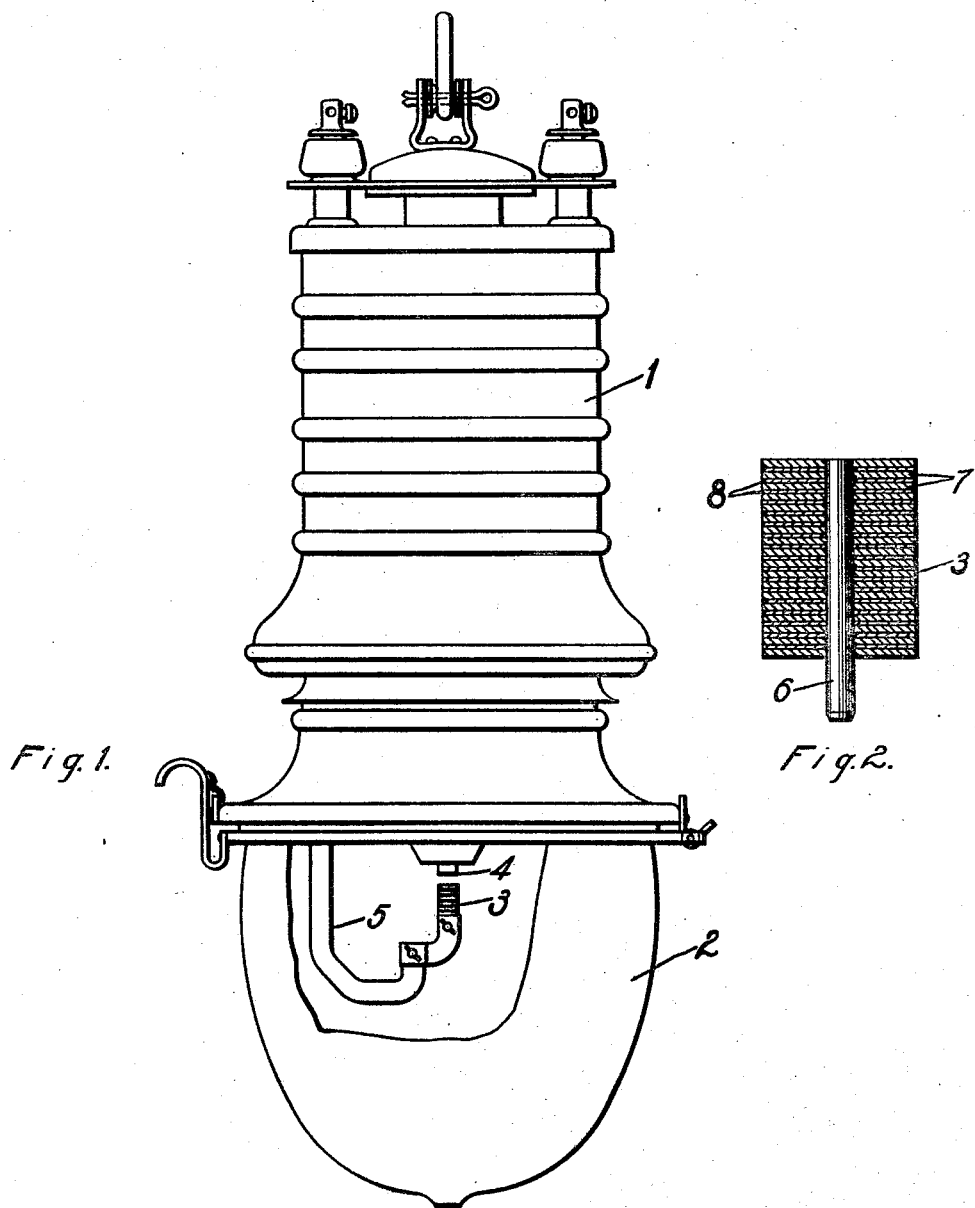

G. M. LITTLE.
ELECTRODE FOR ARC LAMPS.
APPLICATION FILED AUG. 6, 1915.

1,274,725.

Patented Aug. 6, 1918.

WITNESSES:
R. J. Fitzgerald
R. D. Brown

INVENTOR
George M. Little.
BY
Wesley G. Carr
ATTORNEY

UNITED STATES PATENT OFFICE.

GEORGE M. LITTLE, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRODE FOR ARC-LAMPS.

1,274,725.  Specification of Letters Patent.  Patented Aug. 6, 1918.

Application filed August 6, 1915. Serial No. 44,010.

*To all whom it may concern:*

Be it known that I, GEORGE M. LITTLE, a citizen of the United States, and a resident of Pittsburgh, in the county of Allegheny and State of Pennsylvania, have invented a new and useful Improvement in Electrodes for Arc-Lamps, of which the following is a specification.

My invention relates to electrodes for arc lamps, and it has special reference to electrodes which are slowly consumable and which impart flaming properties to the arc, whereby they are particularly adapted for use in arc lamps of the "metallic flame" or "luminous-arc" type.

The object of my invention is to provide a positive electrode for lamps of the above-indicated character which shall produce a steady and uniform light and which shall be consumed to a minimum degree.

In my Patent No. 889,937, granted June 9, 1908 and assigned to the Westinghouse Electric and Manufacturing Company, I have described an electrode of the same general character as that to which my present invention relates, composed of longitudinal alternate strips of copper and iron. The alternate arrangement of copper and iron, as disclosed in my prior patent, is intended to maintain the correct proportions of these metals in the slag which forms upon the tip of the electrode during its operation, and this result is accomplished to a considerable degree. It is found, however, that the arc produced by electrodes of this type is likely to become unsteady and often acquires a rotating or spinning motion, by reason of the magnetic field which forms when an electric current is sent through an electrode of this kind.

According to my present invention, I avoid the disadvantage just mentioned, and obtain other important advantages, by forming the electrode of alternate transverse layers of dissimilar materials, suitably copper and iron, the transverse layers being very thin. By reason of the air spaces between the adjacent layers and the slight oxid scale that is always present upon metallic surfaces, the transference of heat from the upper layers of the electrode is greatly impeded and the end of the electrode is maintained in a very hot condition. The action of the arc soon penetrates several of the uppermost layers and thus exposes both copper and iron, the dimensions of the several layers being so selected that the proper proportions of iron and copper surfaces are thus exposed.

An electrode constructed in accordance with my invention is illustrated in the accompanying drawing, Figure 1 of which is a side elevational view, with parts broken away, of an arc lamp provided with one of my improved electrodes, and Fig. 2 is a longitudinal sectional view of the composite electrode shown in Fig. 1.

The arc lamp shown in the drawing comprises the usual casing 1, globe 2 and positive and negative electrodes 3 and 4, the electrode 3 being carried by a support 5. My present invention relates to the structure of the positive electrode 3.

The electrode 3 consists of a central pin 6, suitably of steel, upon which are driven tightly-fitting iron rings or washers 7, alternating with washers 8 of copper. The iron washers 7 should be considerably thicker than the copper washers 8, but both are very thin, being exaggerated in the drawing for the purposes of illustration. In practice, I find it desirable to make the copper washers about .01 inch and the iron washers about .028 inch in thickness.

It will be evident that, in the course of the operation of a lamp provided with an electrode such as that which I have shown and described, the top of the positive electrode will be maintained in a highly-heated condition owing to the difficult heat transference mentioned above and that, therefore, the slag deposited on the top of the positive electrode will adhere strongly and will be prevented from collecting in a globule and insulating the end of the electrode. The tight adherence of the slag also protects the end of the electrode and causes it to be consumed very slowly.

It will be noted that the present electrode design renders unnecessary the use of slag-anchoring openings which are usually provided in electrodes of this type and, therefore, the present electrodes may be made heavier and will consequently have a longer life.

My invention comprehends broadly the construction of arcing electrodes of alternate transverse layers of dissimilar materials, and it is therefore to be understood that my invention is not restricted to the structural details and materials which I have shown and described but that it is limited only by the scope of the appended claims.

I claim as my invention:

1. An arcing electrode comprising transverse layers of dissimilar materials throughout the length of the consumable portion of the same to provide a constant supply of slag-forming material at the arc and to retard the transference of heat therefrom.

2. An arcing electrode comprising transverse layers of dissimilar conducting materials throughout the length of the consumable portion of the same to provide a constant supply of slag-forming material at the arc and to retard the transference of heat therefrom.

3. An arcing electrode comprising transverse layers of dissimilar conducting materials disposed alternately throughout the length of the consumable portion of the same.

4. An arcing electrode comprising transverse layers of two dissimilar metals disposed alternately throughout the length of the consumable portion of the same.

5. An arcing electrode comprising alternate transverse layers of copper and iron throughout the length of the consumable portion of the same.

6. An arcing electrode comprising a central support and a plurality of rings disposed upon the said support, the said rings being composed alternately of two dissimilar metals.

7. An arcing electrode comprising a central support and a plurality of rings disposed upon the said support, the said rings being composed alternately of copper and iron.

8. An arcing electrode comprising a longitudinally extending supporting member and a plurality of apertured disk members of dissimilar materials disposed thereon.

In testimony whereof, I have hereunto subscribed my name this 22nd day of July, 1915.

GEORGE M. LITTLE.